UNITED STATES PATENT OFFICE 2,637,721

FIBER-FORMING COPOLYMER

Earl W. Gluesenkamp and George E. Ham, Dayton, Ohio, assignors, by mesne assignments, to The Chemstrand Corporation, a corporation of Delaware No Drawing. Application October 5, 1951,
Serial No. 250,018

18 Claims. (Cl. 260—85.5)

This invention relates to new dye-receptive polymers and fibers prepared therefrom. More specifically the invention relates to methods of converting polymers and fibers of non-dye-receptive polymers into polymers of more general purpose utility.

It is well-known that polyacrylonitrile and copolymers of 85 per cent or more of acrylonitrile and up to 15 per cent of other monomeric substances have excellent fiber-forming properties. In general, the polymers of the prior art are not dye-receptive unless a substantial portion of a chemically reactive comonomer is present in polymeric form in the acrylonitrile polymer. Usually such chemically reactive comonomers induce a reduction in the optimum physical properties of the fibers prepared from such polymers.

The purpose of the present invention is to provide a means of converting non-dye-receptive polymers and fibers prepared from such polymers into a dye-receptive form capable of general purpose application. A further purpose of this invention is to provide a new fiber-forming acrylonitrile polymer. A still further purpose of this invention is to provide fibers of novel composition which are fully dye-receptive to acid type dyestuffs. Other purposes of this invention will be apparent from the following description of the invention.

In accordance with this invention it has been found that polyacrylonitrile or copolymers of substantial portions of acrylonitrile and minor portions of other monomers may be reacted with alkyl esters of haloacetic acid in the presence of zinc, whereby dye-receptive nuclei can be introduced into the polymer chains. The exact chemical nature of the reaction is not fully understood, but it is believed that it may involve the following reaction:

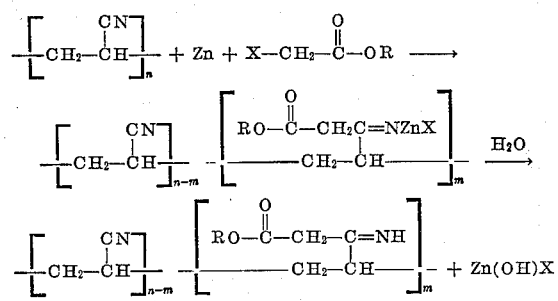

wherein X is a halogen atom of the group consisting of chlorine and bromine, n is a number indicative of the extent of polymerization of the polyacrylonitrile, and m is a number indicating the number of m groups reacted. The reaction may take place on the surface of finely divided solid particles of the polymers, preferably in suspension in a suitable fluid medium. Alternatively, the polymer may be dissolved in a suitable solvent, such as those from which acrylonitrile polymers are conventionally spun, for example, N,N-dimethylformamide, N,N - dimethylacetamide, gamma-butyrolactone, and ethylene carbonate. Another modification of the invention is to react a surface of a finished fiber in a suitable liquid medium or with the surface swollen by action of an acrylonitrile solvent.

Suitable polymers for the practice of this invention are polyacrylonitrile or copolymers of at least 85 per cent and preferably 90 per cent of acrylonitrile and up to 15 per cent of an olefinic monomer copolymerizable therewith, for example, vinyl acetate, or other vinyl ester of a monocarboxylic acid; styrene, or other vinyl substituted aromatic hydrocarbon; α-methylstyrene, or other isopropenyl substituted aromatic hydrocarbon; vinyl chloride, or other vinyl halide; methyl methacrylate, or other alkyl ester of methacrylic acid; methyl acrylate, or other alkyl ester of acrylic acid; dimethyl fumarate, or other dialkyl ester of fumaric acid; dimethyl maleate, or other dialkyl ester of maleic acid; vinylidene chloride, methacrylonitrile; the vinylpyridines; the various alkyl substituted vinylpyridines; and the corresponding vinyl, isopropenyl, allyl and methallyl substituted pyridines, quinolines, imidazoles, pyrazines, oxazoles, imidazolines, pyrimidines, benzimidazoles, benzoxazoles, thiazoles, benzothiazoles, pyridazines, pyrazoles, pyrroles, triazines and other compounds containing N-heterocyclic ring structures.

The preparation of the new dye-receptive polymers is conducted by subjecting the nitrile polymer to the action of an alkyl haloacetate, for example, the bromoacetate or chloroacetate in which the alkyl radical has up to and including four carbon atoms. To render the polymer dye-receptive, it is usually necessary to react from one to ten per cent of the nitrile groups and by the reaction to convert them into the functional imine radicals. To effect the desired result a substantial excess of the haloacetate esters should be used, for example, from five to 50 per cent of the stoichiometric equivalent of the total nitrile radical in the polymer. The metallic zinc, which is also a critical reactant, must necessarily be used in an amount equivalent to the nitrile groups to be reacted, but a slight to substantial excess may be used to expedite the reaction. The necessary reagents and reactants are usually heated to a temperature of 70° C. to 110° C. in order to promote the reaction. The use of temperatures above this range may convert too many nitrile groups to imine groups and give rise to secondary reactions which are undesirable because of deleterious effects on fiber properties and because the cross-linking of the polymer in pre-spun condition may cause gelation to an extent that spinning becomes impracticable. The cross-linking of the polymer may also take place at temperatures within the preferred range if the reaction is conducted for a long period of time. In the preferred practice of this invention the reaction is interrupted prior to the formation of an unspinnable gel, which state can be determined by measuring the viscosity of the polymers or polymer solutions.

The preferred practice of this invention involves the use as the reaction medium of a solvent for the fiber-forming acrylonitrile compositions. Thus, N,N-dimethylformamide, N,N-dimethylacetamide, butyrolactone, ethylene carbonate, and tris(dimethylamido)phosphate are useful solvent media for the practice of the present invention. When the polymers are converted into the dye-receptive form in the manner of this invention using a solvent medium, the fibers may be prepared by extruding the reaction medium directly through the spinning dies, or spinnerets. Under such conditions, it is generally desirable to avoid the use of a substantial excess of zinc metal due to the difficulty of removing the same from the viscous polymer. Under such conditions a larger amount of the alkyl haloacetate may be required to promote a practicable rate of reaction.

Further details of the invention are set forth with respect to the following specific examples:

*Example 1*

A mixture of 14 parts of a copolymer of 97 per cent acrylonitrile and three per cent of vinyl acetate, 14 parts of ethyl chloroacetate, 106 parts of dimethylacetamide, five parts of zinc dust was heated with stirring at 93° C. for two hours. A film was cast on a glass plate and dried at 60° C. for eighteen hours. The film was washed thoroughly with water and then immersed in a Wool Fast Scarlet dyebath containing ten per cent of the dye and 50 per cent of sulfuric acid, the percentages being based upon the weight of the film, and a 200:1 dyebath film ratio. The film was dyed at from 90° C. to 95° C. and the film absorbed a substantial portion of the dye and acquired a bright scarlet color. An additional 15 minutes heating of the solution which was not used in preparing the film caused gelation.

A film of the same copolymer which was not treated with ethyl chloroacetate in the presence of zinc dust did not absorb dye from the above-described standard dyebath.

What we claim is:

1. A method of preparing dye-receptive polymers which comprises treating a polymer of at least 85 per cent of acrylonitrile and up to 15 per cent of other olefinic monomers, with from ten to 50 per cent of the stoichiometric equivalent of the nitrile groups of an alkyl haloacetate having the following structural formula:

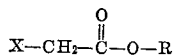

wherein X is a halogen atom of the group consisting of chlorine and bromine and R is an alkyl radical having from one to four carbon atoms, in the presence of metallic zinc in an amount at least equivalent to the nitrile groups to be reacted, and at a temperature in the range of 70° to 110° C.

2. A polymer of at least 85 per cent of acrylonitrile and up to 15 per cent of other olefinic monomers which has been rendered dye-receptive by conversion of from one to ten per cent of the nitrile groups to imine groups by reaction with an alkyl haloacetate having the following structural formula:

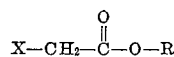

wherein X is a halogen atom of the group consisting of chlorine and bromine and R is an alkyl radical having from one to four carbon atoms, in the presence of metallic zinc in an amount at least equivalent to the nitrile groups to be reacted, and at a temperature in the range of 70° to 110° C.

3. The product of claim 18 wherein the alkyl haloacetate is methyl chloroacetate.

4. The method of claim 1 wherein the alkyl haloacetate is methyl chloroacetate.

5. The product of claim 2 wherein the alkyl haloacetate is methyl chloroacetate.

6. The product of claim 18 wherein the alkyl haloacetate is ethyl chloroacetate.

7. The method of claim 1 wherein the alkyl haloacetate is ethyl chloroacetate.

8. The product of claim 2 wherein the alkyl haloacetate is ethyl chloroacetate.

9. The product of claim 18 wherein the alkyl haloacetate is n-propyl chloroacetate.

10. The method of claim 1 wherein the alkyl haloacetate is n-propyl chloroacetate.

11. The product of claim 2 wherein the alkyl haloacetate is n-propyl chloroacetate.

12. The product of claim 18 wherein the alkyl haloacetate is isopropyl chloroacetate.

13. The method of claim 1 wherein the alkyl haloacetate is isopropyl chloroacetate.

14. The product of claim 2 wherein the alkyl haloacetate is isopropyl chloroacetate.

15. The product of claim 18 wherein the alkyl haloacetate is butyl chloroacetate.

16. The method of claim 1 wherein the alkyl haloacetate is butyl chloroacetate.

17. The product of claim 2 wherein the alkyl haloacetate is butyl chloroacetate.

18. A polymer of at least 85% of acrylonitrile and up to 15% of other olefinic monomers which has been rendered dye-receptive by reacting the same with from 10 to 50% of the stoichiometric equivalent of the nitrile groups of an alkyl haloacetate having the following structural formula:

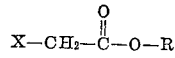

wherein X is a halogen atom of the group consisting of chlorine and bromine and R is an alkyl radical having from one to four carbon atoms, in the presence of metallic zinc in an amount at least equivalent to the nitrile groups to be reacted, and at a temperature in the range of 70° to 110° C.

EARL W. GLUESENKAMP.
GEORGE E. HAM.

No reference cited.